(12) United States Patent
Aso et al.

(10) Patent No.: US 7,812,482 B2
(45) Date of Patent: Oct. 12, 2010

(54) ROD-TYPE LINEAR MOTOR

(75) Inventors: Toshiyuki Aso, Tokyo (JP); Taro Miyamoto, Tokyo (JP); Shuhei Yamanaka, Tokyo (JP)

(73) Assignee: THK Co., Ltd., Tokyo (JP)

( * ) Notice: Subject to any disclaimer, the term of this patent is extended or adjusted under 35 U.S.C. 154(b) by 369 days.

(21) Appl. No.: 11/576,179

(22) PCT Filed: Sep. 30, 2005

(86) PCT No.: PCT/JP2005/018193

§ 371 (c)(1),
(2), (4) Date: Aug. 8, 2008

(87) PCT Pub. No.: WO2006/035946

PCT Pub. Date: Apr. 6, 2006

(65) Prior Publication Data

US 2008/0303356 A1    Dec. 11, 2008

(30) Foreign Application Priority Data

Sep. 30, 2004  (JP)  ............... 2004-286270
Aug. 31, 2005  (JP)  ............... 2005-250605

(51) Int. Cl.
H02K 41/00 (2006.01)
H02K 41/02 (2006.01)
H02K 41/03 (2006.01)
H02K 9/00 (2006.01)

(52) U.S. Cl. ............... 310/15; 310/12.01; 310/13; 310/14; 310/16; 310/52; 310/54; 310/58; 310/59; 310/62; 310/63; 310/64; 165/150; 165/152; 165/170; 29/596

(58) Field of Classification Search ............... 310/12, 310/12.01, 13–16, 52, 54, 58–59, 62–64; 165/150, 152, 170; 29/596; H02K 9/00, H02K 41/00, 41/02, 41/03
See application file for complete search history.

(56) References Cited

U.S. PATENT DOCUMENTS 4,287,444 A * 9/1981 Popov et al. ............... 310/13

(Continued)

FOREIGN PATENT DOCUMENTS

JP      05-258902 A    10/1993

(Continued)

OTHER PUBLICATIONS

International Search Report of PCT/JP2005/018193, date of mailing Dec. 20, 2005.

*Primary Examiner*—Quyen Leung
*Assistant Examiner*—John K Kim
(74) *Attorney, Agent, or Firm*—Westerman, Hattori, Daniels & Adrian, LLP (57) ABSTRACT

By reviewing a material of a forcer housing and an assembly structure of a coil member with respect to the forcer housing, a thrust force is increased, an optimum shape can be easily given to the forcer housing depending on a purpose of use, and a linear motor can be manufactured at low cost. The linear motor includes a magnet rod composed of a large number of magnetic poles arranged with predetermined pitches along an axial direction and a forcer having a through-hole into which the magnet rod is loosely inserted and reciprocatable relatively to the magnet rod according to an applied electric signal. The forcer is composed of a forcer housing in which the through-hole is defined and a coil member which is arranged on an inner peripheral surface of the through-hole of the forcer housing and to which the electric signal is applied. The forcer housing is formed by mold forming with an insulating nonmetal inorganic material.

7 Claims, 9 Drawing Sheets

U.S. PATENT DOCUMENTS

| | | | | |
|---|---|---|---|---|
| 6,008,552 A | * | 12/1999 | Yagoto et al. | 310/12.14 |
| 6,148,597 A | * | 11/2000 | Cook | 57/287 |
| 6,313,552 B1 | * | 11/2001 | Boast | 310/14 |
| 6,495,935 B1 | | 12/2002 | Mishler | |
| 6,825,582 B2 | * | 11/2004 | Hehl | 310/12.13 |
| 6,849,970 B2 | * | 2/2005 | Watanabe | 310/12.22 |
| 7,071,583 B2 | * | 7/2006 | Fukasawa | 310/12.17 |
| 7,239,050 B2 | * | 7/2007 | Miyamoto | 310/12.01 |
| 7,309,934 B2 | * | 12/2007 | Tu et al. | 310/12.12 |
| 7,573,163 B2 | * | 8/2009 | Tu et al. | 310/12.21 |
| 2001/0033110 A1 | * | 10/2001 | Pulford, Jr. | 310/12 |
| 2003/0132672 A1 | * | 7/2003 | Watanabe | 310/12 |
| 2005/0280316 A1 | * | 12/2005 | Nozawa et al. | 310/12 |
| 2007/0096571 A1 | * | 5/2007 | Yuratich | 310/87 |
| 2008/0030081 A1 | * | 2/2008 | Yamaoka et al. | 310/12 |
| 2008/0149303 A1 | * | 6/2008 | Chang et al. | 165/80.2 |
| 2008/0303356 A1 | * | 12/2008 | Aso et al. | 310/15 |

FOREIGN PATENT DOCUMENTS

| | | |
|---|---|---|
| JP | 5-258902 A | 10/1993 |
| JP | 11-150973 A | 6/1999 |
| JP | 11-225468 A | 8/1999 |
| JP | 2002-136097 A | 5/2002 |
| JP | 2002-291220 A | 10/2002 |

* cited by examiner

Fig. 15

ROD-TYPE LINEAR MOTOR

TECHNICAL FIELD

The present invention relates to a rod-type linear motor of such a type that a magnet rod having N magnetic poles and S magnetic poles alternately arranged penetrates a forcer into which a coil member is integrated, and the coil member and the forcer are relatively moved forward and backward, and a method of manufacturing the rod-type linear motor.

BACKGROUND ART

The linear motors have been frequently used as driving sources of a linear actuator that linearly moves goods or members in an FA device such as an X-Y table or a goods carrier device. A so-called linear motor actuator using a linear motor is generally composed of a guide table on which a movable body such as goods to be carried is mounted, a linear guide device that makes the guide table linearly reciprocatable, a linear motor that applies a thrust force to the guide table, and a linear encoder that detects a position of the guide table. The linear actuator controls the linear motor according to a detection value of the linear encoder, thereby making it possible to give the guide table an arbitrary movement with high precision (JP-A 2002-136097).

As the linear motor, there has been known a structure in which a field magnet that acts as a stator in which N magnetic poles and S magnetic poles are alternately arranged is disposed on a base plate, a forcer that acts as a movable element is disposed on a lower surface side of the guide table that is supported by the linear guide device, and the field magnet and the forcer face each other with a slight gap therebetween.

However, in the case where the field magnet is disposed on the base plate, it is necessary to dispose the guide table so as to cross the field magnet in order that the forcer and the field magnet face each other. In addition, it is necessary that a pair of linear guide devices are disposed on both sides of the field magnet to support linear reciprocation of the guide table, which leads to a tendency to enlarge the structure itself of the actuator.

On the other hand, as another type of the linear motor, there has been known a so-called rod type (JP-A 11-150973). The linear motor of the rod type is composed of a magnet rod that acts as a stator which is rod-shaped, has N poles and S poles repetitively arranged along an axial direction thereof, and has both ends supported on the base plate, and a forcer into which the magnet rod is loosely inserted with a slight gap therebetween. The linear motor is configured such that a coil member that is disposed within the forcer is energized, thereby making the forcer move around the magnet rod along the axial direction.

In the linear motor of the rod type, since the coil member surrounds the magnet rod, it is possible to exercise a strong thrust force. In the case where the linear motor of this type is used to configure the actuator, it is possible to give a large thrust force to the guide table while the actuator is downsized. Also, the linear guide device that supports the reciprocation of the guide table is generally composed of a track rail that is disposed on the base plate, and a slider that moves along the track rail. However, in the rod-type linear motor, it is possible to employ a so-called built-up structure in which the forcer is fixed to the slider, and the guide table is further fixed onto the forcer. Therefore, the rod-type linear monitor has such a characteristic that the actuator itself is readily downsized as compared with the type using a biaxial linear guide device as with the linear motor actuator disclosed in JP 2002-136097.

Patent Document 1: JP 2002-136097 A

Patent Document 2: JP 11-150973 A

DISCLOSURE OF THE INVENTION

Problem to be Solved by the Invention

The forcer in the conventional linear motor of the rod type is composed of a metal forcer housing that also acts as a heat sink, and a cylindrical coil member that is fixed onto an inner peripheral surface of a through-hole defined in the forcer housing. After the coil member has been assembled separately from the forcer housing, the coil member is inserted into the through-hole of the forcer housing and then fixed thereto. Because the forcer housing is required to radiate a heat that has been generated by the coil member quickly, an aluminum alloy that is excellent in thermal conductivity is employed as a material of the forcer housing. Also, the use of an aluminum alloy that facilitates extrusion molding makes it possible to relatively readily form the through-hole and a radiation fin in the forcer housing.

On the other hand, since the forcer housing is made of a metal, it is necessary to provide an insulating layer between the forcer housing and the coil member. Also, it is necessary to firmly bond the coil member that generates the thrust force and the forcer housing that is fixed to a slider together. For that purpose, up to now, after an adhesive made of an epoxy resin or the like is applied onto the outer peripheral surface of the coil member that is cylindrically configured, the coil member is fitted into the through-hole of the forcer housing. The epoxy resin, which is excellent in insulation property and also excellent in heat resistance, enables the coil member and the forcer housing to be firmly joined together even when the coil member generates heat, and is optimum as the adhesive between the coil member and the forcer housing.

However, since the epoxy resin is excellent in the heat resistance but low in the heat conductivity, there also arises such a problem that it is difficult that the heat that is generated by the coil member flows into the forcer housing, and larger current cannot flow into the coil member. For example, the heat conductivity of an aluminum alloy (100 series) that acts as an expanded material is about 230 W/m·K at room temperature (20°), but the heat conductivity of an epoxy resin is about $\frac{1}{1000}$ of that of an aluminum alloy, and therefore the epoxy resin layer blocks heat transfer between the coil member and the forcer housing. For that reason, an epoxy resin causes the energization of the coil to be restricted, and limits the thrust force of the linear motor.

Also, in the case where the forcer housing is made of a metal, for example, even if an insulating layer is interposed between the coil member and the forcer housing, an eddy current is developed in the forcer housing when the coil member is energized. As a result, the eddy current induces an energy loss and reduces the thrust force of the linear motor.

In addition, the extrusion molding is preferable in the formation of the forcer housing made of an aluminum alloy at low costs. In this case, there are disadvantages in that the radiation fin can be erected in only the same direction as that of the through-hole, and the cross-sectional shape that is remarkably deviated from the center of the through-hole is improper for the extrusion molding. In other words, there arises such a problem that the configuration of the forcer housing is largely limited, and it is difficult to structure the linear motor having the optimum configuration according to the intended purpose.

Still further, a process of assembling the forcer housing and the coil member is required after the forcer housing and the coil member have been processed separately. This causes the number of steps in forcer manufacturing process to increase and leads to an increase in manufacturing costs.

Means for Solving the Problem

The present invention has been made in view of the above-mentioned problems, and an object of the present invention is to provide a rod-type linear motor which is capable of increasing a thrust force by reviewing the material of the forcer housing as well as an assembling structure of the coil member into the forcer housing, is also capable of readily imparting an optimum configuration to the forcer housing according to an intended purpose, and is further capable of allowing low-cost manufacturing.

In order to achieve the above-mentioned object, according to the present invention, there is provided a linear motor including a magnet rod and a forcer. A large number of magnetic poles are disposed in the magnet rod at given pitches along an axial direction thereof, and a through-hole into which the magnet rod is loosely inserted is defined in the forcer. Also, the forcer includes a forcer housing in which the through-hole is formed, and a coil member that is arranged on an inner peripheral surface of the through-hole of the forcer housing. In the above structure, when an electric signal is supplied to the coil member, a magnetic suction and a magnetic repulsion are generated between the respective magnetic poles of the magnet rod and the coil member, and the forcer and the magnet rod are relatively moved forward and backward along the axial direction of the magnet rod.

In the present invention, the forcer housing is formed by molding using a mold made of nonmetallic inorganic material having insulation property. Since the forcer housing itself is made of an insulating material, it is unnecessary to form an insulating layer between the coil member and the forcer housing, and a heat that is generated by the coil member directly flows into the forcer housing, thereby making it possible to facilitate the cooling of the coil member. In other words, it is possible to increase an electric energy that is supplied to the coil member as compared with that in the conventional art, and it is also possible to correspondingly improve the thrust force of the linear motor.

Also, when the forcer housing itself constitutes an insulating member, since an eddy current is prevented from occurring in the forcer housing when the coil member is energized, the energy loss is suppressed, thereby making it possible to increase the thrust force.

In addition, when the forcer housing is made of nonmetallic inorganic material, that is, ceramics in the broad sense, the weight of the forcer itself can be reduced more than that of the metallic forcer housing, thereby making it possible to enhance a response of the motion of the forcer to the supply of a signal in cooperation with an increase in the above-mentioned thrust force.

Still further, when the forcer housing is formed by molding, the forcer housing having a more complicated configuration can be manufactured at the low costs, thereby making it possible to manufacture the linear motor having the optimum configuration that is adapted for the installation space or the required thrust force according to various intended purposes. Also, it is possible that after the cylindrical coil member that surrounds the magnet rod is assembled in advance, the forcer housing is directly formed on the periphery of the coil member by molding to bond the coil member and the forcer housing together. It is also possible to simplify the forcer assembling process, thereby reducing manufacturing costs can be reduced.

DESCRIPTION OF REFERENCE NUMERALS

1 . . . linear motor actuator, 2 . . . base plate, 3 . . . track rail, 4 . . . slider, 5 . . . guide table, 6 . . . linear motor, 6a . . . magnet rod, 6b . . . forcer, 61 . . . forcer housing, 62 . . . coil member

BEST MODE FOR CARRYING OUT THE INVENTION

Hereinafter, a description will be given in more detail of a rod type linear motor according to the present invention with reference to the accompanying drawings.

Figure 1:
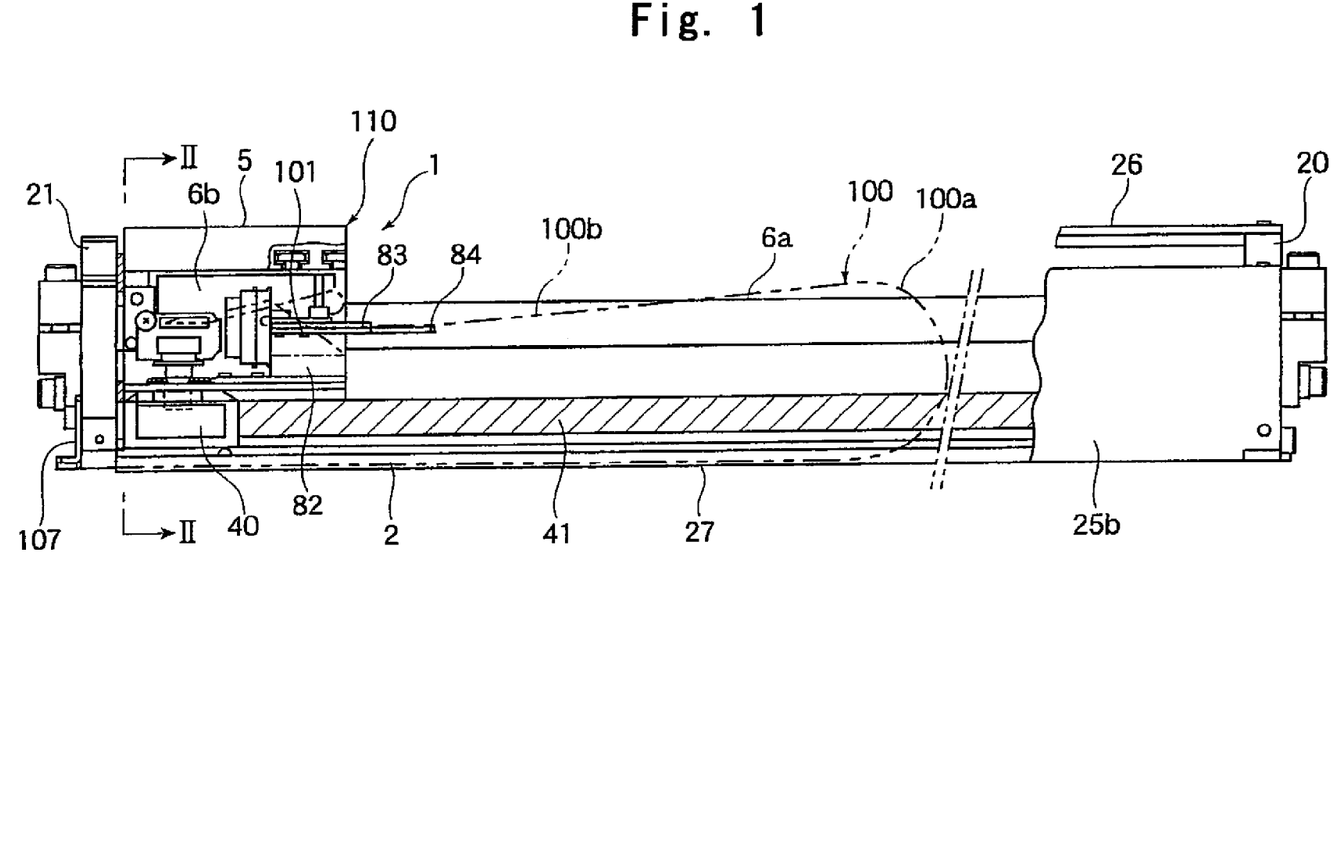
FIG. 1 is a side view showing a first embodiment of a linear motor actuator using a linear motor of the present invention.
Figure 2:
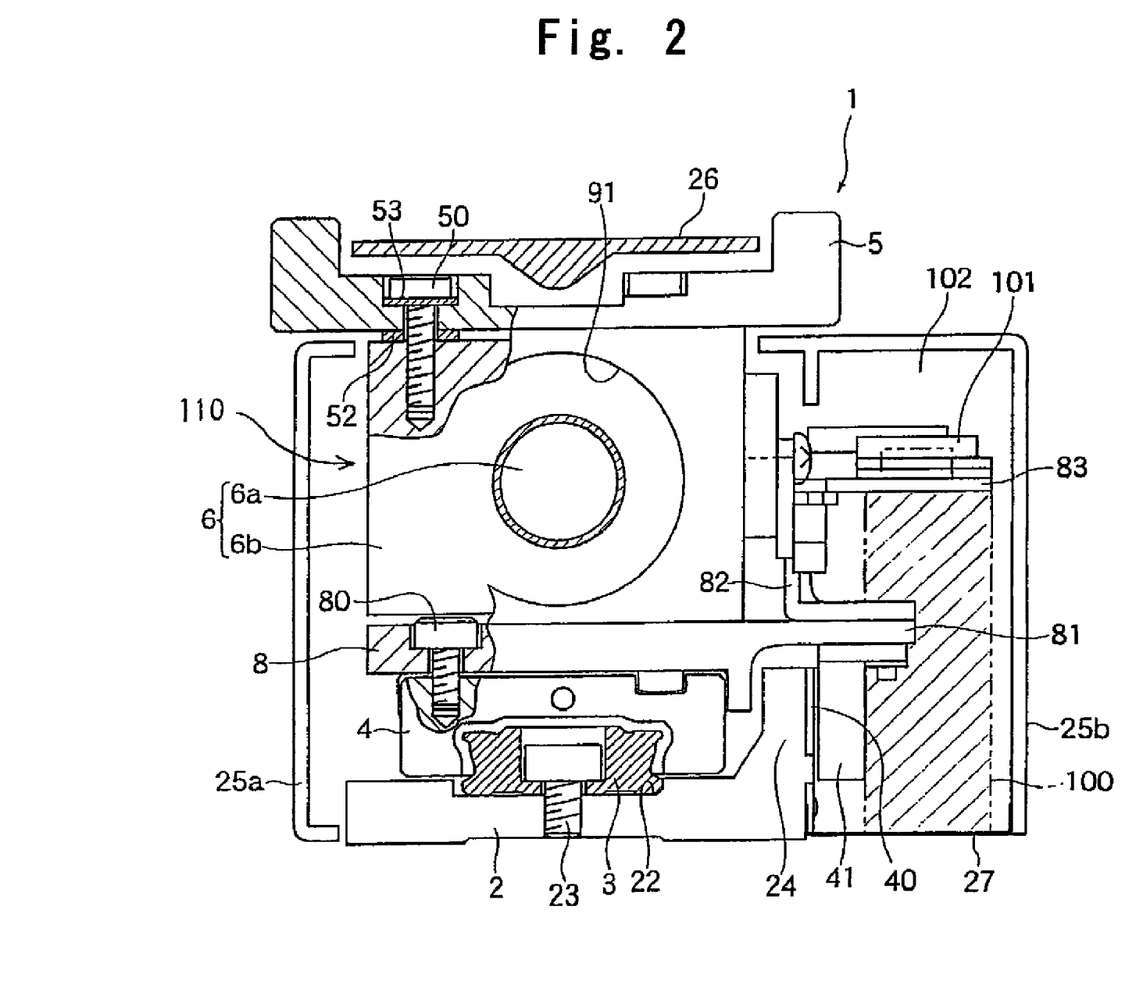
FIG. 2 is a cross-sectional view taken along the line II-II of FIG. 1.

FIGS. 1 and 2 are a side view and a front sectional view showing a first embodiment of an actuator that uses a linear motor of the present invention as a driving source, respectively. A linear motor actuator 1 is composed of a long base plate 2, one track rail 3 that is disposed on the base plate 2 along a longitudinal direction thereof, a slide carriage 110 that is linearly reciprocatable along the track rail, one slider 4 that is included in the slide carriage 110 and assembled in the track rail through a large number of balls, a movable stage 5 that is fixed to the slider 4 and has a mounting surface of an object to be carried, and a linear motor 6 that supplies a thrust force to the movable stage 5. With the above-mentioned configuration, the linear motor actuator 1 reciprocates the object to be carried that is mounted on the movable stage 5 along the longitudinal direction of the base plate 2 and stops the object at an arbitrary position.

Figure 3:
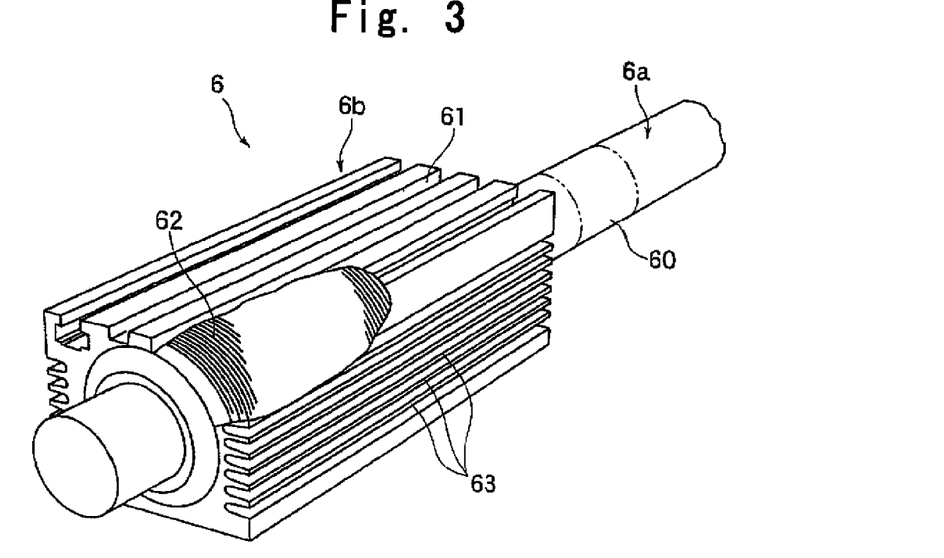
FIG. 3 is a perspective view showing a linear motor according to the first embodiment.
Figure 4:
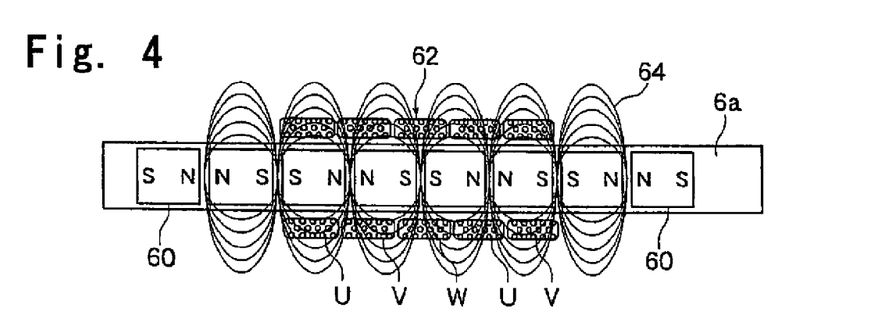
FIG. 4 is a side view showing an operation principle of the linear motor according to the first embodiment.

FIG. 3 is a perspective view showing the linear motor 6. The linear motor 6 is composed of a magnet rod 6a that acts as a stator that is formed in a long cylinder, and a forcer 6b that acts as a movable element into which the magnet rod 6a is loosely inserted with a slight gap therebetween. A plurality of permanent magnets 60 are arranged in the magnet rod 6a along the axial direction thereof, and the outer peripheral surface of the magnet rod 6a is machined to be smooth. As shown in FIG. 4, each of the permanent magnets 60 has an N pole and an S pole, and the permanent magnets 60 are alternately opposite in the orientation so that the N poles or the S poles of the adjacent magnets face each other. With this configuration, the magnet rod 6a is formed with a drive magnetization portion in which the N poles and the S poles are alternately disposed in the longitudinal direction thereof, which form a field magnet.

As shown in FIG. 1, the magnet rod 6a has both ends thereof fixed to a pair of end plates 20 and 21, respectively, and the pair of end plates 20 and 21 are so fixed as to face each other on both ends of the base plate 2 in the longitudinal direction thereof. That is, the magnet rod 6a is fixed on the base plate 2 like a both-end supporting beam.

On the other hand, the forcer 6b houses the cylindrical coil members 62 within a forcer housing 61 that is formed in a quadrangular prism as a whole. A plurality of radiation fins 63 are erected on a surface of the forcer housing 61 in parallel to the longitudinal direction of the magnet rod 6a. The plurality of radiation fins 63 transmit a heat that has been generated by the coil members 62 to the forcer housing 61 when the coil members 62 are energized, and radiate the heat to the surrounding atmosphere, thereby making it possible to effectively cool the coil members 62 themselves.

Figure 5:
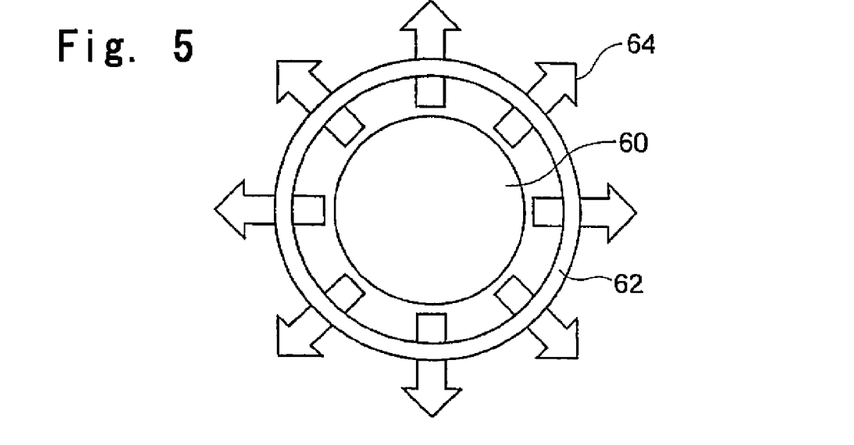
FIG. 5 is a front view showing the operation principle of the linear motor according to the first embodiment.

FIGS. 4 and 5 show the operating principle of the linear motor 6. The coil members 62 have coil groups each of which has three coils of U, V, and W phases as one set. The coil members 62 of any phases are ring-shaped, and face the outer peripheral surface of the magnet rod 6a with a slight gap therebetween. Also, the arrangement pitches of the coil members 62 of the respective phases are set to be shorter than the arrangement pitches of the permanent magnets 60. A magnetic flux 64 is developed in the magnet rod 6a from the S poles toward the N poles, and a magnetic pole sensor (not shown) that detects the magnetic flux density is built in the forcer 6b. Therefore, the positional relationship of the respective magnetic poles (N poles and S poles) of the magnet rod with respect to the coil members is grasped from a detection signal that is outputted from the magnetic pole sensor. A controller that controls the energization of the coil members receives a detection signal of the magnetic pole sensor, calculates the optimum current according to the positional relationship between the coil members and the respective magnetic poles of the magnet rod, and supplies the calculated optimum current to the respective coil members. As a result, the interaction between the currents that flows in the respective coil members 62 and the magnetic flux 64 that are developed by the permanent magnets 60 allows suction and repulsion to be developed between the coil members 62 and the respective magnetic poles of the permanent magnets 60 with the result that the forcer 6b is driven forward in the axial direction of the magnet rod 6a.

Figure 6:
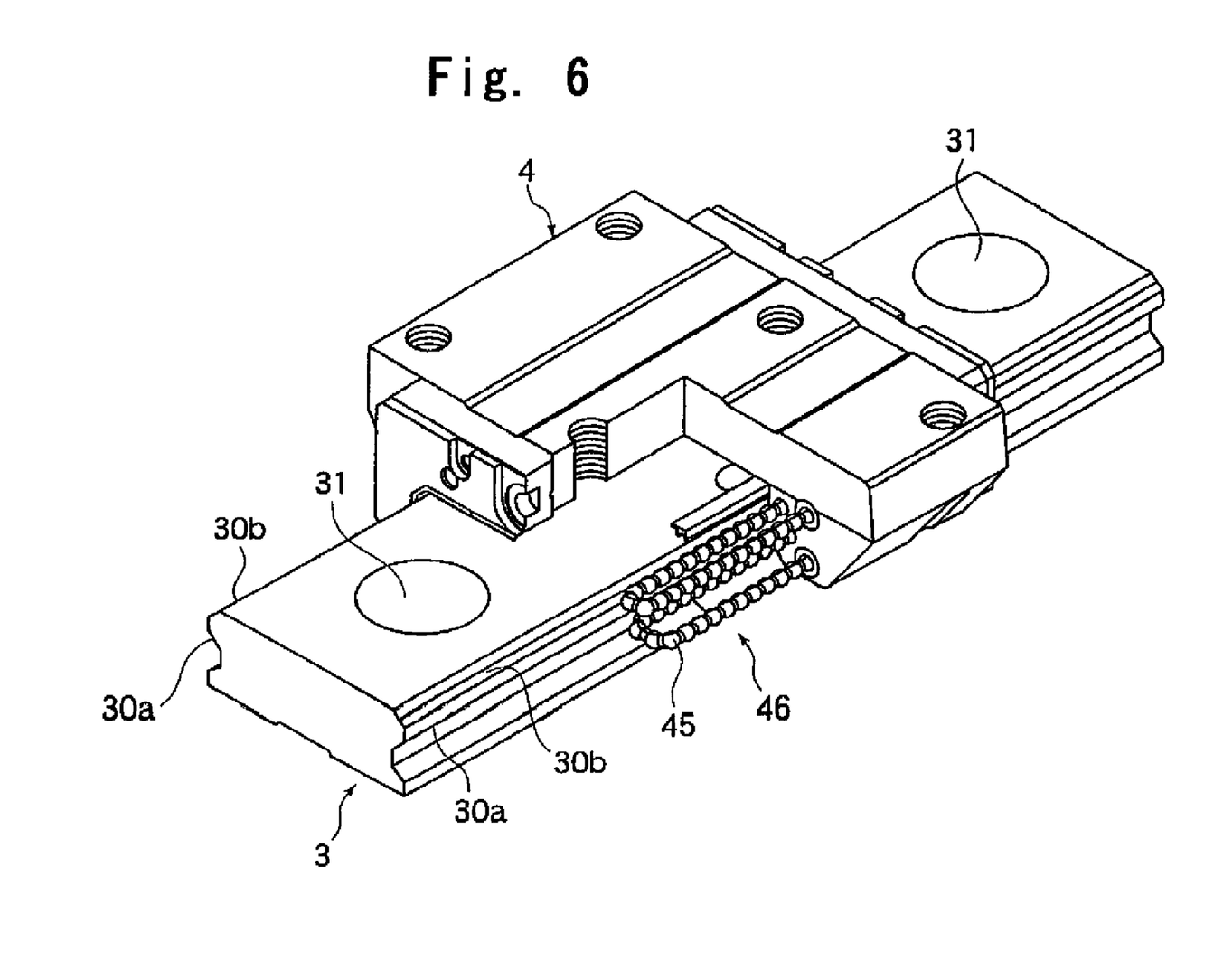
FIG. 6 is a perspective view showing a linear guide device according to the first embodiment.

As shown in FIG. 2, the track rail 3 and the slider 4 constitute the linear guide device that makes the movable stage 5 reciprocatable on the base plate 2. FIG. 6 is a perspective view showing an example the linear guide device, and the track rail 3 has a cross section perpendicular in the longitudinal direction formed in a substantially rectangle shape. The track rail 3 has substantially the same length as the overall length of the base plate 2, and is disposed in parallel to the longitudinal direction of the base plate 2. Four streaks of ball rolling grooves 30a and 30b are defined on both side surfaces of the track rail 3 in the longitudinal direction with two streaks on each side. The ball rolling grooves 30a that are positioned on the lower side are formed downward with respect to the bottom surface of the track rail 3 by 45 degrees, and the ball rolling grooves 30b that are positioned on the upper side are formed upward by 45 degrees so that the slider 4 evenly receives a radial load, an inverse radial load, and a horizontal load. Also, mounting holes 31 for inserting fixing bolts thereinto are defined in the track rail 3 at given intervals along the longitudinal direction.

On the other hand, the slider 4 that travels along the track rail 3 has a guide groove to which the upper portion of the track rail 3 is fitted with a slight gap therebetween is formed in a saddle shape, and also has a ball endless circulation path in which a large number of balls 45 circulate. With this configuration, the balls 45 roll in the ball rolling grooves 30a and 30b of the track rail 30 whereby the slider 4 is capable of continuously traveling along the track rail 3. Also, the balls 45 are arranged in a ball cage 46 that is made of a flexible synthetic resin, and the balls 45 circulate together with the ball cage 46 in the interior of the endless circulation path. With this configuration, the balls 45 always circulate in the interior of the ball endless circulation path in an aligned state without being snaked, and a trouble that the balls 45 lodge in the ball endless circulation path during circulation is prevented, thereby making it possible to stabilize the sliding resistance of the slider 4. The slider 4 is subject to a load that is exerted in a direction perpendicular to the longitudinal direction of the track rail 3, that is, a direction perpendicular to the travel direction of the slider 4, and prevents the forcer 6b of the linear motor 6 from being subject to loads in directions other than the axial direction of the magnet rod 6a.

The base plate 2 is formed with a fixed base groove 22 for receiving the bottom of the track rail 3 along the longitudinal direction, and the track rail 3 is fixed onto the base plate 2 with the fixing bolts 23 in a state where the side surfaces of the track rail 3 are abutted against the side surfaces of the fixed base groove 22. The fixed base groove 22 is formed in parallel to the axial direction of the magnetic rod 6a having both ends thereof supported by the end plates 20 and 21, thereby ensuring the parallel state of the track rail 3 and the magnet rod 6a. Also, a side wall 24 is erected on one end of the base plate 2 in the width direction in the longitudinal direction, and a magnetic scale 40 that constitutes a linear encoder is fixed onto an outer surface of the side wall 24 across the entire area in the travel direction of the slider 3.

In addition, the slider 4 is fixed with a saddle plate 8 for supporting the movable stage 5. The saddle plate 8 is fixed to an upper mounting surface of the slider 4 with a mounting bolt 80. As shown in FIG. 2, a flange 81 for fixing a read head 41 of the linear encoder is projected on one end of the saddle plate 8 in the width direction, and the flange 81 is disposed so as to extend over a side wall 24 of the base plate 2. The read head 41 of the linear encoder is fixed so as to hang from the flange 81, and faces the magnet scale 40 that is fixed to the side wall 24 of the base plate 2. With this configuration, when the slider 4 travels along the track rail 3, the read head 41 of the linear encoder travels along the magnet scale 40 so as to grasp the movement of the slider 4 with respect to the base plate 2 according to an output signal of the read head 41.

As the linear encoder, it is possible to select a linear encoder having a resolution that meets the requirements of the linear motor actuator, and it is possible to arbitrarily select a type that detects a change in the magnetism in the magnet scale or a type that optically reads a pattern that has been formed on the scale surface.

Figure 7:
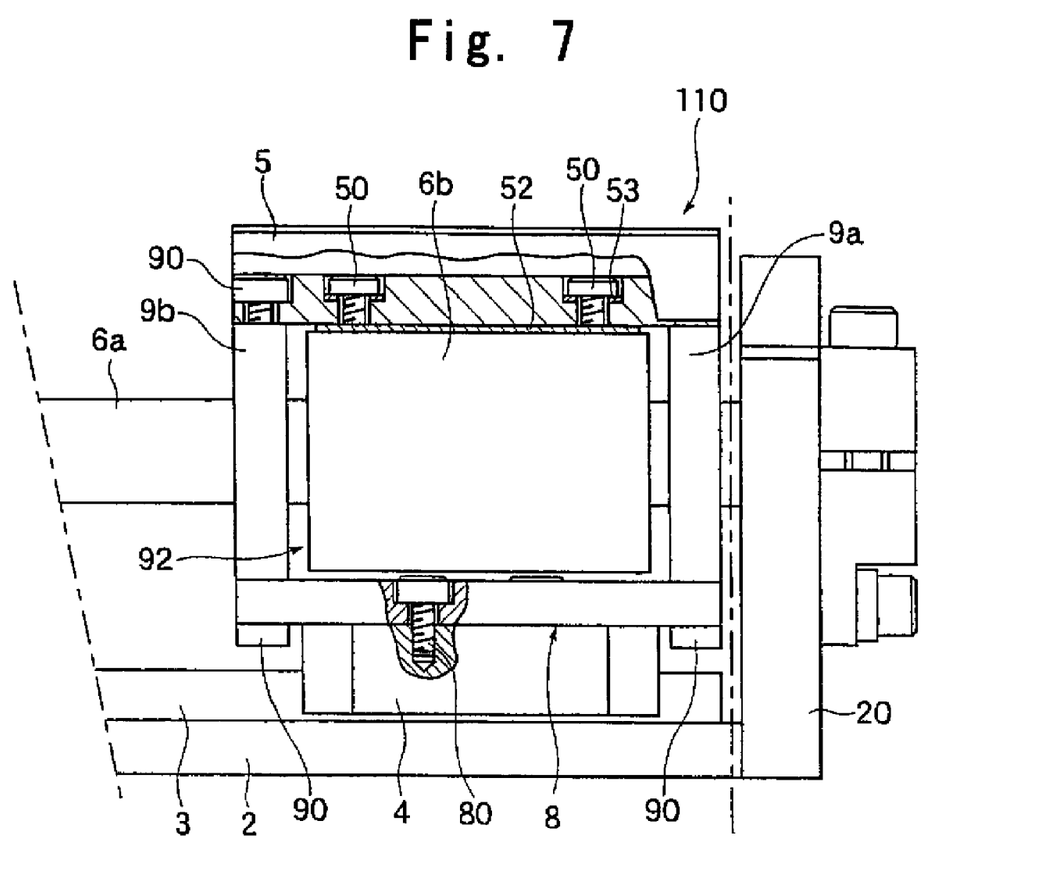
FIG. 7 is an enlarged side view showing a configuration of a slide carriage of the linear motor actuator according to the first embodiment.

FIG. 7 is a side view showing the configuration of the slide carriage 110. A pair of support plates 9a and 9b are erected on both ends of the saddle plate 8 in the travel direction of the saddle plate 8, and the movable stage 5 is fixed to the two support plates 9a and 9b. The respective support plates 9a and 9b are fixed to the saddle plate 8 and the movable stage 5 with a fixing bolt 90, and as shown in FIG. 2, a release hole 91 through which the magnet rod 6a penetrates is defined in the center thereof. Then, a space that is sandwiched anteroposteriorly by the support plates 9a and 9b exists between the saddle plate 8 and the movable stage 5, and the space constitutes a receiving space 92 for the forcer 6b of the linear motor 6.

It is possible to integrate the saddle plate 8 and the slider 4 with each other, and it is unnecessary to dare to provide the saddle plate 8 when the support plates 9a and 9b can be erected directly in front of and behind the slider 4.

The forcer 6b is not directly fixed to the saddle plate 8 and the support plates 9a and 9b, but is fixed to the lower surface of the movable stage 5 with a pendant bolt 50 that penetrates through the movable stage 5. In this state, the magnet rod 6a is loosely inserted into the forcer 6b. Also, in order to prevent a heat that has been generated by the energization of the forcer 6b from flowing into the movable stage 5, a heat insulating member 52 is interposed between the movable stage 5 and the forcer 6b, and a heat insulating member 53 is also interposed between the pendant bolt 50 and the movable stage 5.

As described above, the forcer 6b is positioned in the receiving space 92 in a state where the forcer 6b hangs from the movable stage 5. The forcer 6b is held out of contact with the saddle plate 8 and the support plates 9a and 9b. That is, the spaces are defined between the forcer 6b and the saddle plate 8, and between the forcer 6b and the support plates 9a and 9b, and the heat that has been generated by the energization of the forcer 6b is prevented from directly flowing into the slider 4.

The slide carriage 110 is constituted as the combination of the slider 4, the movable stage 5, and the forcer 6b. As shown in a front sectional view of FIG. 2, a pair of side covers 25a and 25b are disposed on both sides of the travel route of the slide carriage 110 whereas a top cover 26 is disposed above the movable stage 5 so as to prevent dusts from adhering to the track rail 3 or the magnet rod 6a. The side covers 25a and 25b, and the top cover 26 are erected on both ends of the base plate 2, and fixed to the pair of end plates 20 and 21.

On the other hand, in order to supply electricity to the coil members 62 of the forcer 6b from a control box (not shown), and to transmit an output signal from the read head 41 of the linear encoder to the control box, a signal relay board 101 is mounted on the slide carriage, and is connected to the control box by means of a flat cable 100. A board bracket 82 is fixed onto the upper surface of the flange 81 of the saddle plate 8, and the signal relay board 101 is fixed onto a mounting web 83 of the board bracket 82. The flat cable 100 is provided with a signal line for energizing the coil members 62 and a signal line for transmitting the output signal of the read head 41 arranged therein, and other signal cables are used to connect the signal relay board 101 to an input port of the forcer 6b and to an output port of the read head 41.

As shown in FIG. 2, a receiving space 102 of the flat cable 100 is defined between the side cover 25b and the side wall 24 of the base plate 2, and a cable bracket 27 for mounting the flat cable 100 is attached onto a lower end of the side wall of the base plate 2 along the longitudinal direction of the base plate 2. As shown in FIG. 1, the flat cable 100 is inserted into the receiving space 102 from a gap defined between the lower end of the end plate 21 and the cable bracket 27, and then fitted to the signal relay board 101 after being gently bent in the interior of the receiving space 102 so as to turn around.

In this embodiment, the housing 61 of the forcer 6b which acts as the movable element of the linear motor 6 is made of an insulating nonmetallic inorganic material. More specifically, the material is a hydraulic composition like cement, and the hydraulic composition resulting from mixing hydraulic fine powders (Portland cement, silicate calcium, calcium aluminate, etc.) and nonhydraulic fine powders (sodium hydroxide, calcium carbonate fine powders, slag fine powders, etc.) together at a constant rate is molded in a given configuration including the radiation fins 63 to obtain an uncured compact. Then, after the uncured compact is unmolded, moisture is supplied to the uncured compact to start hydration reaction, and the uncured compact is cured. As the curing method, there can be employed known methods, for example, low-pressure steam curing, high-pressure steam curing, or hydrothermal curing.

Taking the assembling of the coil members 62 into the forcer housing 61 into consideration, it is preferable that the forcer housing 61 is molded directly outside the coil members 62. This makes it possible to simply integrate the forcer housing 61 and the coil member 62 together without using an adhesive, thereby making it possible to reduce the manufacture costs of the forcer 6b. As the mold forming, it is possible to apply extrusion molding or injection molding, and the injection molding is more preferable when the forcer housing 61 is to be complicatedly configured. In the case of the injection molding, after the coil members 62 that have been cylindrically assembled is set within a mold as an inserter, hydraulic composition is injected into the mold, and the uncured compact of the forcer housing 61 is formed around the coil members 62. Both end surfaces of the coil members 62 that has been cylindrically formed in the axial direction are also covered with the molded forcer housing 61, to thereby retain the coil members 62 in the force housing 61. Then, the uncured compact that has been unmolded from the mold is cured, thereby making it possible to obtain the forcer housing 61 that has been integrated with the coil members 62 and cured.

As described above, the insulating forcer housing 61 is molded directly outside the coil members 62, whereby the coil members 62 and the forcer housing 61 come into contact with each other without any gap, and no insulating layer is interposed between the coil members 62 and the forcer housing 61. Accordingly, the heat that has been generated by energization of the coil members 62 readily flows into the forcer housing 61, thereby making it possible to promote the cooling of the coil members 62. As a result, it is possible to set a current value that is supplied to the coil members 62 to be higher than that in the conventional art so that a still larger thrust force can be generated in the linear motor 6.

Also, since no eddy current occurs in the insulating forcer housing 61 even if the coil members 62 are energized, there is no case where the energy is consumed by the generation of the eddy current for no purpose. From this viewpoint also, it is possible to improve the thrust force of the linear motor 6.

The physicality of the forcer housing 61 used in this embodiment is 1400 J/kg·K in specific heat, 2.5 W/m·K in heat conductivity, and $1 \times 10^{14}$ Ω·cm in volume resistivity. The heat conductivity of the forcer housing 61 is about $\frac{1}{100}$ of an aluminum alloy that acts as a wrought product, but is at least 20 times of that of an epoxy resin that has been conventionally used as an adhesive between the forcer housing 61 and the coil members 62. As a result, a rate at which the heat that has been generated by the coil members 62 flows into the forcer housing 61 can be sufficiently increased as compared with the conventional art. As a result, the cooling of the coil members 62 can be promoted, and the thrust force of the linear motor 6 can be improved as described above.

The hydraulic composition that is applicable to the extraction molding or the injection molding is disclosed in JP-A 2004-10387 and JP-A 2004-2100, and the use of the hydraulic compositions disclosed in those publications make it possible to form the forcer housing.

Figure 8:
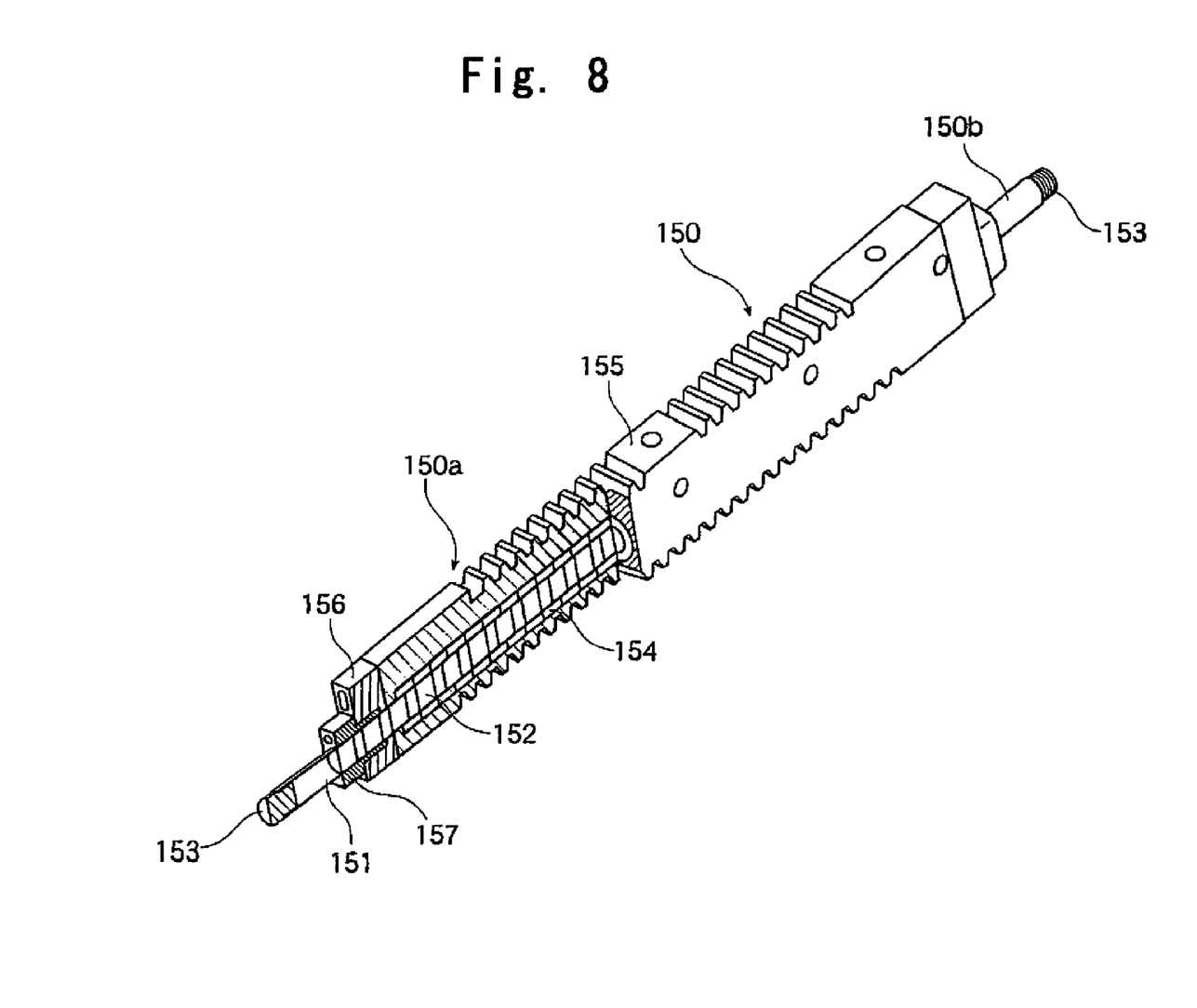
FIG. 8 is a perspective view showing a linear motor according to a second embodiment of the present invention.

FIG. 8 shows a linear motor according to a second embodiment of the present invention. In the rod-type linear motor 6 used in the first embodiment, the magnet rod 6a is fixed to the base plate 2, and the forcer 6b that constitutes a part of the slide carriage 1 reciprocates along the magnet rod 6a. On the other hand, in the linear motor 150 according to the second embodiment, it is assumed that a forcer 150a is fixed to various mechanical devices, and a magnet rod 150b that penetrates through the forcer 150a travels forward and backward.

The magnet rod 150b is composed of a stainless pipe 151, a large number of permanent magnets 152 that are disposed in a hollow portion of the pipe 151, and a pair of end plugs 153 that covers both ends of the pipe 151. The N poles or the S poles of the adjacent permanent magnets 152 face each other within the pipe 151. With this configuration, the magnet rod 150b is formed with a drive magnetization portion in which the N poles and the S poles are alternately disposed in the longitudinal direction thereof, which form a field magnet.

On the other hand, the forcer 150a is formed in the shape of a quadrangular prism whose cross section perpendicular to the axial direction of the magnet rod 150b is rectangular, and a through-hole into which the magnet rod 150b penetrates is defined in the center of the forcer 150a. The forcer 150a is composed of a forcer housing 155 that stores coil members 154 therein, a pair of forcer ends 156 that acts as bearing support members which are fixed to both ends of the forcer housing 155 in the longitudinal direction thereof, and a pair of bearing bushes 157 that are fitted into the forcer ends 156 and supports the traveling forward and backward of the magnet rod 150b. The coil members 154 are arranged on the inner peripheral surface of the through-hole which is defined in the forcer housing 155. The magnet rod 150b comes into sliding contact with the bearing bushes 157 but is held out of contact with the forcer ends 156 and the coil members 154 with gaps of about 0.2 mm therebetween. Also, a plurality of radiation fins are erected on the surface of the forcer housing 155, transmit the heat that is generated by the coil members 154 when the coil members 154 are energized to the forcer housing 155, and radiate the heat toward the surrounding atmosphere so as to effectively cool the coil members 154 themselves.

Similarly, in the second embodiment, the forcer housing 155 is made of an insulating nonmetallic inorganic material. More specifically, as in the first embodiment, the material is a hydraulic composition like cement, and the forcer housing 155 is made of the hydraulic composition resulting from mixing hydraulic fine powders (Portland cement, silicate calcium, calcium aluminate, etc.) and nonhydraulic fine powders (sodium hydroxide, calcium carbonate fine powders, slag fine powders, etc.) together at a constant rate. The hydraulic composition is allowed to flow into a mold, and molded in a given configuration including the radiation fins, etc., to obtain an uncured compact. Then, after the uncured compact is unmolded, moisture is supplied to the uncured compact to start hydration reaction, and the uncured compact is cured to manufacture the forcer housing 155.

Figure 9:
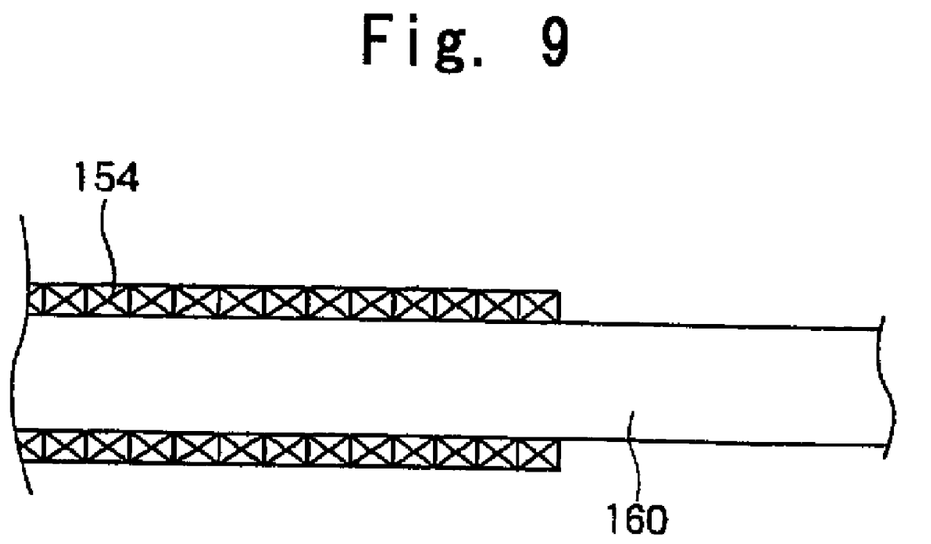
FIG. 9 is a side view showing an assembly of a coil member of the linear motor according to the second embodiment.

FIGS. 9 to 15 show a process of manufacturing the forcer housing 155 and the forcer 150a. First, FIG. 9 shows a process of assembling the coil members 154 using a base shaft 160. The base shaft 160 has a diameter that is slightly larger than the diameter of the magnet rod 150b. For example, when the diameter of the magnet rod 150b is Φ5.5 mm, the diameter of the base shaft 160 is about Φ5.9 mm. The coil members 154 have coil groups each of which has three coils of U, V, and W phases as one set, and are assembled so as to wind around the base shaft 160. The coil members 154 of any phases are ring-shaped, and the arrangement pitches of the coil members 154 of the respective phases are set to be shorter than the arrangement pitches of the permanent magnets 152.

Figure 10:
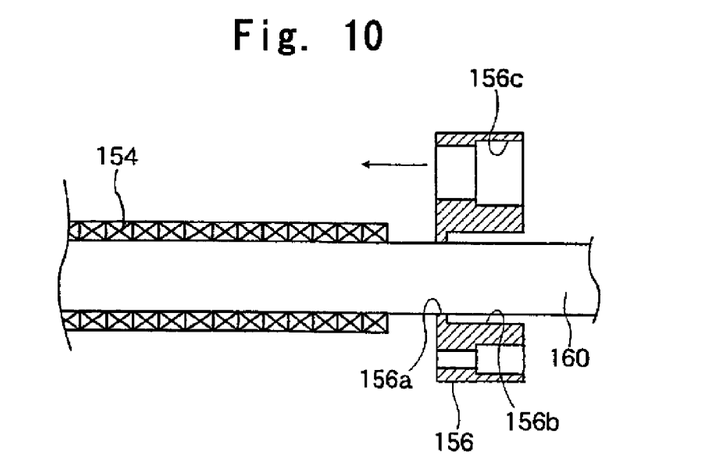
FIG. 10 is a side view showing the assembly of a forcer end of the linear motor according to the second embodiment.

Then, as shown in FIG. 10, after the coil members 154 have been assembled around the base shaft 150, the pair of forcer ends 156 are disposed at both ends of the base shaft 160. A through-hole 156a having an inner diameter that coincides with the diameter of the base shaft 160 is defined in each of the forcer ends 156, and the base shaft 160 is fitted into the through-holes 156a of the forcer ends 156 without any gaps. That is, the forcer ends 156 are positioned with respect to the coil members 154 that are assembled around the base shaft 160 through the base shaft. Also, a base hole 156b that is positioned coaxially with the through-hole 156a is defined in each of the forcer ends 156, and a void 156c that is filled with the hydraulic composition when mold forming is conducted which will be described later is defined in each of the forcer ends 156.

Figure 11:
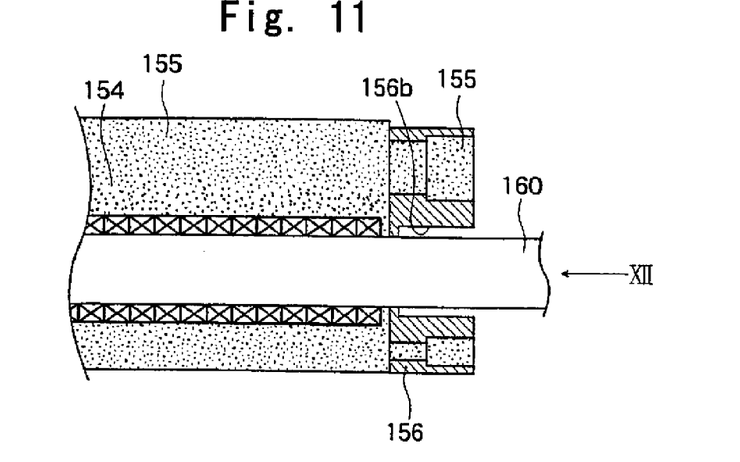
FIG. 11 is a side view showing a molded forcer housing of the linear motor according to the second embodiment.
Figure 12:
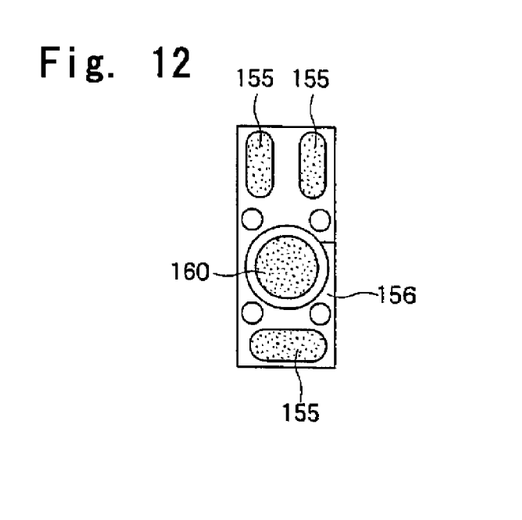
FIG. 12 is a perspective view taken along the arrow VII of FIG. 11.

As described above, the coil members 154 are assembled around the base shaft 160, and the coil members 154 are sandwiched between the forcer ends 156. Thereafter, the coil members 154 and the forcer ends 156 are set into a mold together with the base shaft 160 as an inserter, a hydraulic composition is injected into the mold, and an uncured composition that forms the forcer housing 155 is formed around the coil members 154. As shown in FIGS. 11 and 12, molded hydraulic composition covers the coil members 154, and also fills the voids 156c of the forcer ends 156. Since a step is formed within each of the voids 156c, the forcer ends 156 and the coil members 154 are integrated with each other by the uncured compact after the uncured compact has been formed. Then, the uncured compact that has been unmolded from the mold is cured, thereby making it possible to obtain the forcer housing 155 that is formed by integrating the coil members 154 and the forcer ends 156 with each other, and curing those.

Figure 13:
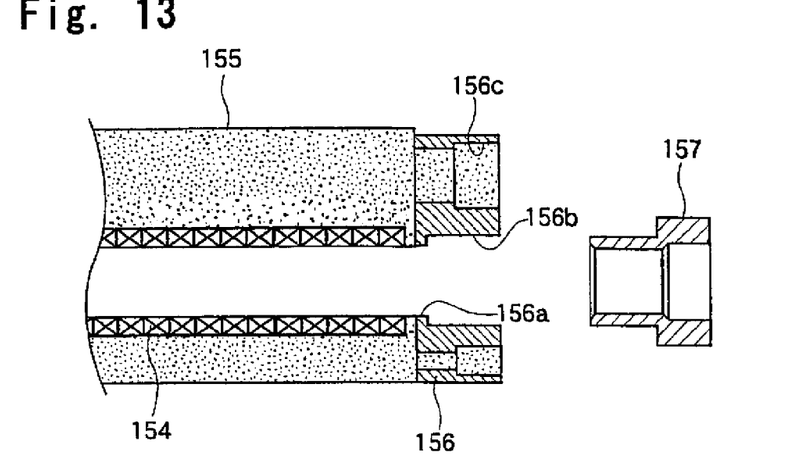
FIG. 13 is a side view showing the assembly of a bearing bush of the linear motor according to the second embodiment.

In this way, after the forcer housing 155 has been cured, after the base shaft 160 has been extracted from the forcer housing 155, as shown in FIG. 13, the bearing bushes 157 are fitted into the base holes 156b that are formed coaxially with the through-holes 156a of the forcer ends 156. As described above, since the through-holes of the forcer ends 155 are positioned with respect to the center of the coil members 154, the base holes 156c are resultantly positioned with respect to the center of the coil members 154. When the bearing bushes 157 whose outer diameter dimension is managed are fitted into the base holes 156b, the center of the bearing bushes 157 is precisely positioned with respect to the center of the coil members 154.

Figure 14:
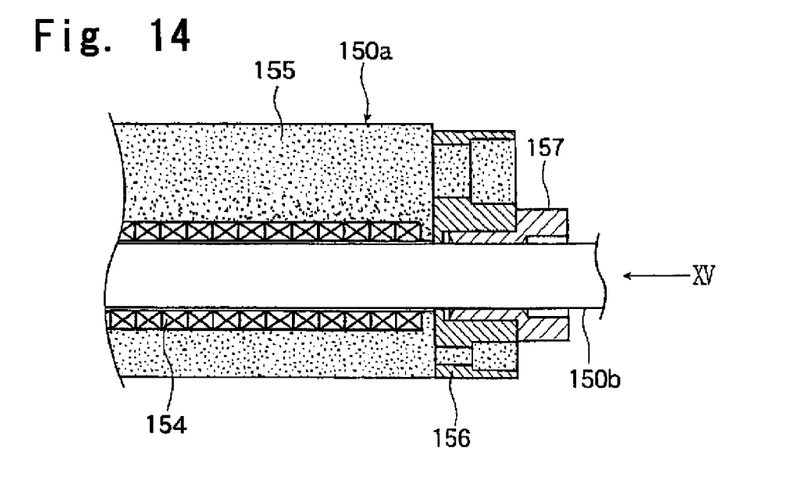
FIG. 14 is a side view showing a state in which the forcer of the linear motor has been assembled according to the second embodiment.

When the bearing bushes 157 have been fitted into the respective forcer ends 156 that are positioned on both ends of the forcer housing 155, as shown in FIG. 14, the magnet rod 150b is inserted into the forcer housing 155, and the magnet rod 150b is supported by the bearing bushes 157 at both ends of the forcer housing 155. As described above, since the center of the bearing bushes 157 is precisely positioned with respect to the center of the coil members 154, the center of the magnet rod 150b that is supported by the bearing bushes 157 precisely coincides with the center of the coil members 154, and a uniform gap is defined between the outer peripheral surface of the magnet rod 150b and the inner peripheral surface of the coil members 154.

Figure 15:
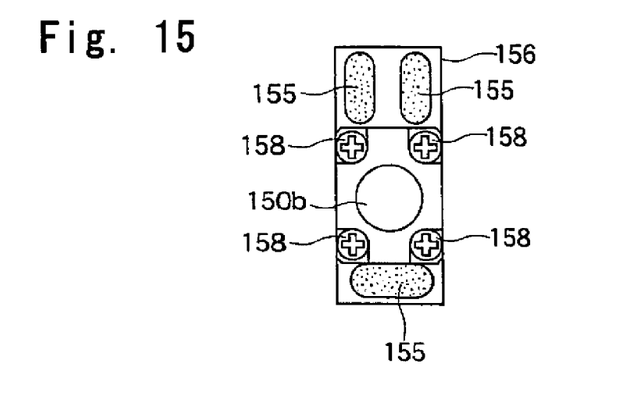
FIG. 15 is a perspective view taken along the arrow XV of FIG. 14.

After the magnet rod 150b has been assembled into the forcer housing 155, as shown in FIG. 15, the bearing bushes 157 are fastened to the forcer ends 156 with fixing screws 158, thus completing the manufacture of the forcer 150a.

In the forcer 150a according to the second embodiment, the forcer ends 156 and the coil members 154 are positioned coaxially through the base shaft 160, the forcer ends 156 and the coil members 154 are integrated with each other by mold forming of hydraulic composition while the positioned state is kept, and the bearing bushes 157 are positioned by the aid of the forcer ends 156. As a result, the magnet rod 150b that is fitted into the bearing bushes 157 can be precisely positioned coaxially with respect to the coil members 154. Inn other words, it is possible to keep the gap between the magnet rod 150b and the coil members 154 finely and evenly, and it is possible to prevent the magnet rod made of stainless steel from coming in contact with the coil members to leak a current that flows in the coil members to the magnet rod. Hence, the thrust force when the magnet rod 150b travels forward and backward can be exercised to a maximum extent, and unevenness can be prevented from occurring in the thrust force.

The invention claimed is:

1. A rod-type linear motor, comprising a magnet rod having a large number of magnetic poles arranged at given pitches along an axial direction, and a forcer having a through-hole into which the magnet rod is fitted and travels forward and backward relatively with respect to the magnet rod according to a supplied electric signal,
   wherein the forcer comprises a forcer housing having the through-hole defined therein, and coil members that are arranged on an inner peripheral surface of the through-hole of the forcer housing and are supplied with the electric signal, and
   wherein the forcer housing is formed by molding of an insulating nonmetallic inorganic material.

2. A rod-type linear motor according to claim 1, wherein the nonmetallic inorganic material comprises a hydraulic composition.

3. A rod-type linear motor according to claim 1, wherein the coil member are integrated with the forcer housing by mold forming of the of the force housing.

4. A rod-type linear motor according to claim 3,
   wherein a pair of bearing support members are disposed on opening portions at both ends of the through-hole of the forcer housing so as to be adjacent to the coil members and coaxially with the coil members, and the bearing support members are integrated with the forcer housing and the coil members by mold forming of the forcer housing, and
   wherein bearing bushes are fixed to the respective bearing support members to support the traveling forward and backward of the magnet rod with respect to the forcer.

5. A method of manufacturing a rod-type linear motor according to claim 1, comprising:
   preparing a base shaft having a diameter that is larger than the diameter of the magnet rod by an amount corresponding to a gap between an outer peripheral surface of the magnet rod and the inner peripheral surface of the coil members,
   inserting the base shaft and the coil member into a mold after the coil members are assembled in contact with the outer peripheral surface of the base shaft;
   injecting the insulating nonmetallic inorganic material into a cavity of the mold to mold the forcer housing that is integrated with the coil members; and
   extracting the base shaft from the coil members and the forcer housing to form a through-hole, and inserting the magnet rod into the through-hole.

6. A method of manufacturing a rod-type linear motor according to claim 5, wherein a pair of bearing support members into which the base shaft is closely fitted is disposed adjacent to both sides of the coil members, the bearing support members are integrated with the coil members and the forcer housing when the injection molding of the forcer housing is conducted by using the nonmetallic inorganic material, bearing bushes are fixed to the pair of bearing members, respectively, after the base shaft is extracted from the forcer hosing, and the magnet rod is fitted into the bearing bushes so as to be movable forward and backward.

7. A linear motor actuator, comprising: a base plate; a track rail disposed on the base plate, a slider that is reciprocatable along the track rail; a magnet rod that acts as a stator having both ends thereof supported in parallel to the track rail just above the slider; a forcer that acts as a movable element that is fixed to the slider and into which the magnet rod is loosely inserted; and a guide table that is positioned just above the magnet rod and reciprocates together with the forcer and the slider,
   wherein the forcer includes a forcer housing having the through-hole defined therein, and a coil members that are disposed on an inner peripheral surface of the through-hole of the forcer housing and supplied with the electric signal, and
   wherein the forcer housing is formed by mold forming of an insulating nonmetallic inorganic material.

* * * * *